Dec. 11, 1962 H. FREMONT ETAL 3,068,321

MULTIPLEX TRANSMISSION AND RECEPTION SYSTEM FOR STEREOPHONIC MATERIAL

Filed Dec. 26, 1958

INVENTORS.
HERBERT FREMONT
HAROLD N. PARKER
BY Flam and Flam
ATTORNEYS.

United States Patent Office 3,068,321
Patented Dec. 11, 1962

3,068,321

MULTIPLEX TRANSMISSION AND RECEPTION SYSTEM FOR STEREOPHONIC MATERIAL

Herbert Fremont, Los Angeles, and Harold N. Parker, Van Nuys, Calif., assignors to Calbest Engineering & Electronics Co., Los Angeles, Calif., a corporation of California Filed Dec. 26, 1958, Ser. No. 783,015
16 Claims. (Cl. 179—15)

Figure 1:
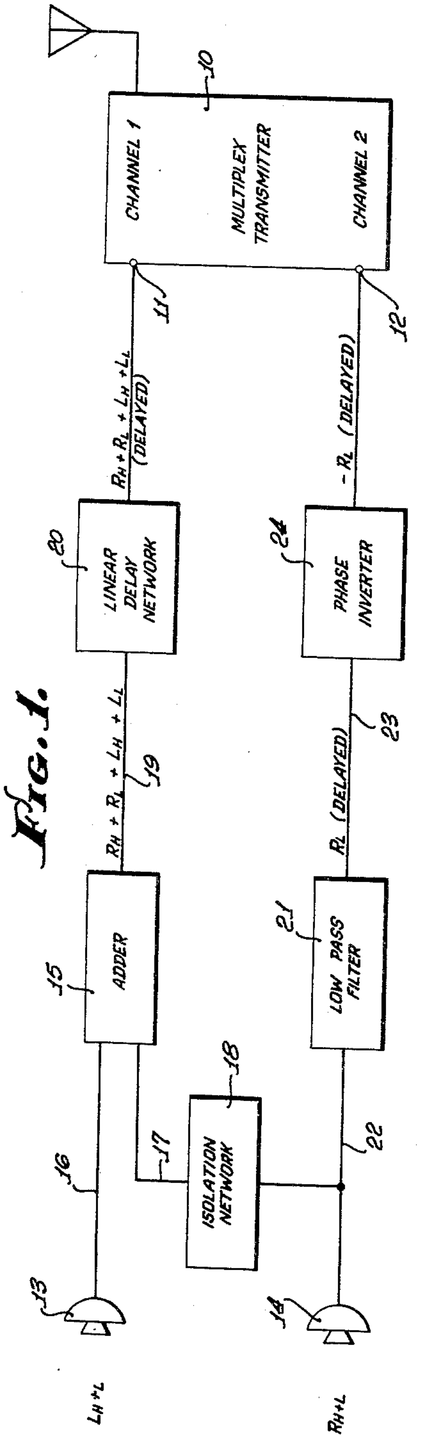

This invention relates to multiplex communication systems, and particularly to a multiplex transmission and reception system for stereophonic program material.

Stereophonic broadcast transmission of course requires that two audio channels be provided, corresponding to a left-hand pickup and a right-hand pickup. For purposes of reproduction, separate electrical-acoustic channels are provided for the respective stereophonic components.

The obvious use of multiplex transmission and reception for stereo purposes is that the left audio signal, for example, be derived directly from the main carrier, and that the other or right audio signal be derived from the subcarrier. While essentially simple, this system has a serious disadvantage in that a conventional receiver having no provisions for deriving information from the subcarrier wave will receive only one of the two stereo channels, in this instance the left channel. If a solo performance uses the right channel, obviously important program material is lost.

In order to overcome the basic disadvantage of the foregoing system, Crosby (Patent No. 2,851,532, issued September 9, 1958) proposed a multiplex system in which the full signal $(L+R)$ for both right and left channels is derived from the main carrier. The symbol "L" denotes the left channel signal, and "R" the right channel signal. The subcarrier carries a signal corresponding to the difference between the two channels, say $(L-R)$. For stereophonic reception by the aid of a multiplex receiver, the respective signals are so combined either by addition or subtraction as to recreate the respective right and left channels. Thus, $(L+R)+(L-R)$ results in the left channel signal, and this is applied to one electrical-acoustic channel. And, $(L+R)-(L-R)$ results in the right channel signal, this being applied to the other electrical-acoustic channel. The system is compatible in that a conventional receiver derives the full signal $(L+R)$ from the carrier, and there is no loss of fidelity.

Unfortunately there are serious disadvantages in connection with the Crosby system. First of all, the permissible band width (or frequency deviation corresponding to information) for a broadcasting station in the FM range is confined to 75 kilocycles. The signals transmitted in the Crosby system are essentially identical so far as band width requirements are concerned. Thus, both channels must allow for combined maximum swings of the respective components. Thus, virtually half of the 75 kc. band must be allotted to each. A 75 kc. swing being defined arbitrarily as 100% modulation, obviously the modulation cannot exced fifty percent. Because the modulation is reduced by a factor of two, necessarily the signal-to-noise ratio is sacrificed, and the quality of reception both for a multiplex reception and a conventional reception is reduced. Furthermore, the Crosby system depends upon precise equality between the respective channels in order that they be recombined effectively to produce the desired stereo separation. Thus, if they are not identical, slight amounts of signal from the left channel will appear in the right channel, and vice versa. Precise equality is difficult to obtain and the stereo separation rarely exceeds twenty decibels in the low frequency range. But fundamentally, even if the Crosby system produces a fairly reasonable stereo effect, its main drawback is that it is wasteful of spectrum space. High-fidelity bands must be provided for each of the transmitter channels.

The primary object of this invention is to provide an improved multiplex system for stereo transmission and reception that is compatible and that also conserves spectrum space. By the use of the system presently to be described, faithful stereo transmission and reception requires only a narrow added band of three or four kilocycles. Accordingly, there is spectrum space available for other multiplex channels. These might, for example, be used by a broadcast station for other commercial public service purposes. Thus, a control signal might be provided that silences receivers of private subscribers during commercial advertising.

It is now understood that high-fidelity program material depends upon the faithful broadcasting and reception of frequencies within the range of, say, between 30 c.p.s. and 15 kc. No material sacrifices so far as flat response characteristics are concerned can be allowed. But so far as stereo effect is concerned, we have discovered that this does not depend upon faithful reproduction over a 15 kc. band. Frequency components above 3500 cycles per second play only a negligible part in stereo effects. There are several reasons for this. First of all, the human ear has difficulty determining the origin of frequencies above 3000 cycles, and direction in any event can rarely, if ever, be perceived for frequencies above 4000 cycles at least in rooms of normal proportions. Reflections in a small room introduce random phase-shift relationships that bear little, if any, resemblance to the origin of the sounds. Furthermore, frequencies of about 2000 c.p.s. and below tend to be in phase at the spaced transmitting microphones and very little stereo effect, if any, is perceived due to such frequencies.

Another object of this invention is to provide an improved system incorporating the principles outlined hereinabove.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Figure 2:
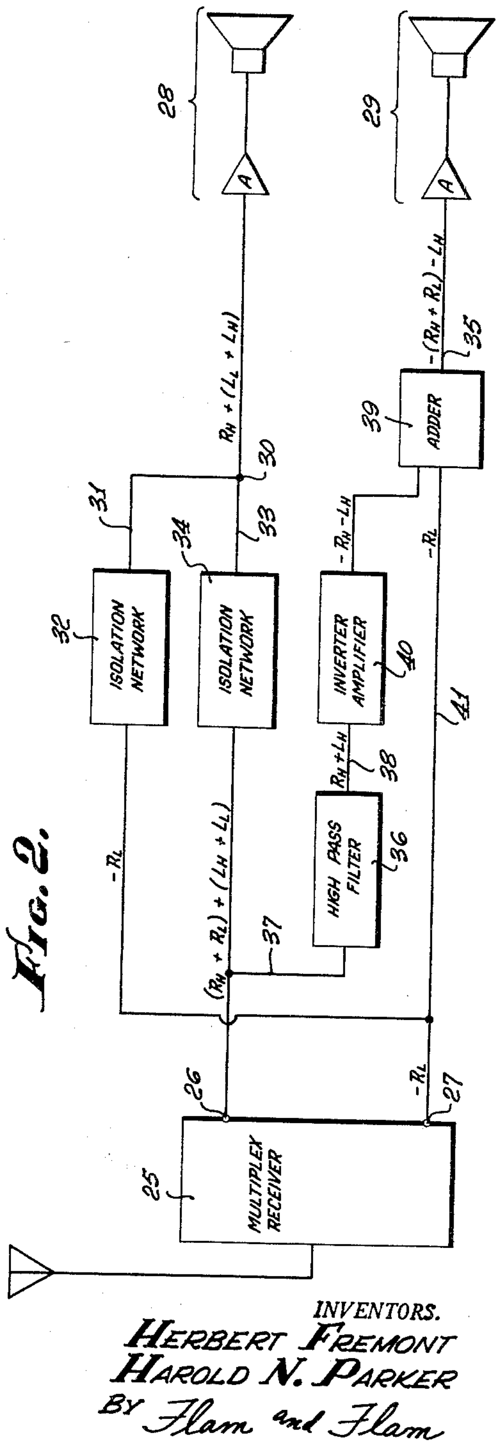

FIGURES 1 and 2 are diagrammatic views illustrating respectively, by aid of block diagrams, a transmitter and a receiver constructed in accordance with the principles of this invention.

In the drawings, there is illustrated a multiplex transmitter 10 having two input channels as indicated at terminals 11 and 12. One channel, in this instance the one designated at 11, transmits the combined signal from two stereo transducers 13 and 14. The transducers 13 and 14 may be microphones placed in spaced relationship relative to live broadcast material, or they may be channels of a stereophonic reproducer such as a tape recorder or the like.

Signals from the respective transducers 13 and 14 are combined by the aid of an adder network 15. A lead 16 directly joins the electrical output of the transducer 13 to one input of the adder, and a lead 17 joins the other input of the adder 15 to the electrical output of the other transducer 14. An appropriate isolation network 18 is inserted in one of the leads 17.

The output from the adder 15 is passed to the input channel 11 of the multiplex transmitter 10 by the aid of a lead 19. Interposed in the lead 19 is a linear delay network 20, the function of which is to be described more fully hereinafter.

Symbols adjacent the transducers 13 and 14 identify the signals existing at these transducers. The symbol $L_H+L_L$ denotes high frequency and low frequency components of the total left signal. The symbol $R_H+R_L$ denotes the high frequency and low frequency components of the right signal, respectively.

The output from the adder 15 carries the legend indicating that all components of the respective signals exist at the lead 19 and in the multiplex transmitter channel 11.

The transducer 14 is connected to a low-pass filter 21 by the aid of a lead 22. The filter passes, in this instance, all frequencies up to about 3800 cycles per second. $R_L$ denotes all frequencies below 3800 c.p.s. The output from the low-pass filter, namely, $R_L$, is supplied to the second channel 12 of the multiplex transmitter 10. For this purpose, a lead 23 is provided. Included in the lead 23 is a phase inverter 24, the purpose of which will appear hereinafter. Thus, the signal $-R_L$ is transmitted by the channel 12.

A multiplex receiver 25 detects information from the main carrier and the subcarrier and supplies two outputs, as at 26 and 27, corresponding respectively to the transmitter inputs 11 and 12. Thus, at the output 26 a signal corresponding to the total combined signal $(R_L+R_H+L_L+L_H)$ is reproduced, and at the channel 27 a signal corresponding to $-R_L$ is reproduced.

The signals from the respective receiver outputs 26 and 27 are combined in order to achieve the desired separation between the low frequency components of the respective outputs from the transducers 13 and 14. Thus, at one channel 28 the low frequency component only of the left signal exists. Symmetrically in the second channel 29 the low frequency component only of the right signal exists. Thus, separation in the low frequency range below approximately 3800 c.p.s. is achieved, and effective stereo reproduction will be produced by the respective channels 28 and 29.

At the same time, both electrical-acoustic channels 28 and 29 carry the high frequency components of both the right and left signals. Thus, these components add virtually nothing to the stereo effect but are faithfully reproduced in both channels.

The manner in which the signals from the multiplex receiver outputs 26 and 27 are combined is as follows: The signals are directly combined at a terminal 30 which is common to the input of the electrical-acoustic channel 28. A lead 31 connects this terminal 30 to the multiplex receiver output 27, an isolation network 32 being interposed therein. A lead 33 connects the multiplex receiver output 26 to the terminal 30, an isolation network 34 likewise being interposed therein. The components $R_L$ and $-R_L$ cancel each other, and the result applied to the input of the electrical-acoustic channel 28 will be $R_H+L_H+L_L$.

The low frequency component of the right signal is available without addition or subtraction processes. Hence, its isolaiton from $L_L$ is complete in and of itself. No fraction of $L_L$ enters the right channel whether precise equality is maintained or not. While the converse is not true, the overall effect is an improvement of stereo separation by a factor of two.

The high frequency components $L_H+R_H$ are also supplied to the other electrical channel 29 along with $R_L$. Since these components exist only at the receiver output 26 whereas $R_L$ is available at the opposite output 27, combining circuits must be provided. A high-pass filter 36 passes $L_H$ and $R_H$ from output 26 to an adder network 39. The filter input connects with the receiver output by a lead 37.

An output lead 38 from the high-pass filter 36 connects to one input of the adder 39. Interposed in the lead 38 is an inverter 40 so that the reference sign of the signal is reversed to conform to the reference sign of the low frequency component of the right signal. The output 27 connects directly to the other adder input by a lead 41.

The respective signals are combined and there is produced at the output 35 of the adder a combined signal $-R_H-R_L-L_H$.

The input to the electrical-acoustic channel 29 connected to adder output 37 is accordingly symmetrical with respect to that of the other electrical-acoustic channel 28.

The low frequency signal transmitted in the multiplex transmitter channel 12 has a frequency range of approximately 3.8 kc. and not the full normal high-fidelity range of 15 or 20 kc. Accordingly, the band width for the subcarrier can be and is quite restricted. This leaves an ample range for the full signal at the multiplex channel 11. Still, there may be band width left over for sending additional information through a second subcarrier. Full fidelity reception, both as to stereophonic effect and linearity effects, is obtained. At the same time, the full signal is available from the main carrier for high-fidelity reception from a conventional receiver.

The low-pass filter 21 in the transmitter necessary to restrict the output to the low frequency component of the right signal introduces phase shifts. While the phase shift cannot be eliminated, it can be made to be linear up to a frequency quite close to the cutoff frequency. As a necessary corollary when the phase shift is linear, there are no attenuations, and faithful transmission, except for the phase shift, is preserved. Linear phase shift can be achieved, for example, by a series of filter sections in accordance with standard practice. By selecting appropriate circuit values, phase shift may be made linear to 95% of the cutoff frequency. Thus, an *m*-factor of 1.4 in an *m*-derived wave filter produces this result. The low-pass filter 21 is accordingly so designed.

The phase shift introduced by the filter 21 remains at the output of the multiplex receiver 27. Obviously if the delay signal $-R_L$ at output 27 is to be combined arithmetically to counterbalance $R_L$ at the output 26, the delay or phase shift of $R_L$ at output 26 must correspond to that of $-R_L$. This is achieved by similarly introducing appropriate linear phase shift into the main combined signal $R_H+R_L+L_H+L_L$. While this could be done at the receiver, it is obviously more economical to incorporate means for accomplishing this at the transmission end. Thus, there is only one transmitter.

The delay network 20 is so designed that the phase shift introduced in the main signal will be linear and equal to that introduced by the low-pass filter 21. But the delay network in this instance must be linear throughout the entire frequency range of the combined signal, namely, to about 15 or 20 kc. in order that no attenuations exist. This result is also accomplished by an *m*-derived filter, but with the cutoff frequency substantially at or above 15 kc. When the signals from the multiplex receiver outputs 26 and 27 are recombined at the terminal 30, appropriate arithmetic additions result, and the desired signal is supplied to the electrical-acoustic channels.

Phase shifts introduced in the high frequency components of the total signal are quite immaterial since the ear does not perceive a simple phase shift.

The high-pass filter 36 in the receiver end of the system can be inexpensively constructed as a simple RC filter. This filter will be effective to eliminate the low frequency components but it will also introduce certain attenuations. Accordingly, the inverter 40 may conveniently incorporate a stage of amplification so that the signal supplied to the adder 39 through the high-pass filter is unattenuated.

For compensation of the signals in the respective channels, it will be appreciated that the signals from the transducers 13 and 14 arrive at the input to the multiplex transmitter in unattenuated form. As long as the transmitter and receiver are balanced so far as their channels are concerned, there will be no further compensation problem.

The inventors claim:

1. A compatible system for broadcasting stereophonic program material: transmitting means having two channels for transmitting information; a pair of transducers for providing first and second signals having a common radio frequency range and corresponding to right and left or the like; means for applying to one of said channels of said transmitting means the qualitative combined output of said transducers throughout a frequency range substantially coextensive with the common audio frequency range of said first and second signals; and means for applying only the low frequency components of only one of the signals to the other of said channels.

2. The combination as set forth in claim 1 in which said means for applying the low frequency components to the other of said channels includes a filter that cuts off substantially at the region of 3800 cycles per second.

3. A transmission system for stereophonic program material: a pair of broadcast channels for transmitting information; a pair of transducers for providing first and second signals corresponding to right and left or the like; a filter for passing low frequency components and providing linear phase shift substantially to its cutoff point; connection means, including said filter, between one of said transducers and one of said broadcast channels; a linear phase shift network for passing all frequencies substantially throughout the bandwidth of the first and second signals; means applying the qualitative combined signals from said transducers to the input of said network; and means for applying the output of said network to the other broadcast channel; the linear phase shift of the filter and the network being substantially equal whereby the information transmitted by said transmitter may be combined arithmetically at a receiver to recreate the respective first and second signals.

4. The combination as set forth in claim 3 in which said broadcast channels are related as main carrier and subcarrier.

5. The combination as set forth in claim 3 in which said connection means also includes an inverter whereby the signals transmitted are conditioned for direct recombination.

6. The combination as set forth in claim 3 in which said connection means cooperates exclusively with said one transducer, and whereby a signal corresponding to the low frequency component of said one transducer output inverted in phase is applied to said one broadcast channel.

7. In combination: a multiplex receiver for stereophonic reproduction having a pair of outputs, at one of which the combined signal of two stereo channels may exist and at the other of which may exist the low frequency component of only one of the two stereo channels inverted in phase relative to the corresponding component at said one output; a pair of transducers for converting electrical signals; means for applying the combined receiver outputs to one of the transducers; means for applying the said other output to the other of the transducers; and means for isolating the low frequency component of the said combined signal from said other transducer.

8. The combination as set forth in claim 7 together with connection means including a high-pass filter between said one receiver output and the other of said transducers for balancing high frequency components between the transducers.

9. The combination as set forth in claim 7 together with connection means between said one receiver output and the other of said transducers, and including an inverter and a high-pass resistor-capacitor filter, said inverter including a stage of amplification for compensating the attenuation of said resistor-capacitor filter.

10. A compatible stereophonic multiplex transmission system comprising: a pair of transducers for producing a right stereo signal and a left stereo signal; a transmitter having a main channel and a subchannel; circuit means, including a filter having linear phase shift substantially to a cutoff frequency within the frequency range of the right and left signals, for applying the low frequency component of one of said stereo signals to said subchannel; circuit means, including a device having linear phase shift equal to that of said filter and operative throughout the frequency range of said right and left signals, for applying the qualitative combination of said right and left signals to said main channel; a receiver having means for reproducing the signals applied to the main channel and the subchannel; a pair of audio channels; means for algebraically combining the channel signals to eliminate the low frequency component of said one of said stereo signals while retaining the low frequency component of the other of said stereo signals and applying the same to one of said audio channels; and means for applying the said low frequency component of said one of said stereo signals to the other of said audio channels.

11. The combination as set forth in claim 10 together with means for relatively inverting the phases of the signals applied to the broadcast channels.

12. The combination as set forth in claim 10 together with means for applying only the high frequency components of the said one audio channel to the other audio channel thereby to balance high frequency reception between the channels.

13. A compatible stereophonic transmission system comprising a transmitter and receiver, the transmitter having a first and a second output channel and two input channels, the two input channels being cooperable with two transducers for providing first and second signals corresponding to right and left or the like; means for applying the qualitative combined signal from said input channels to said first output channel; circuit means for applying only the low frequency components of the signal at only one of said input channels to the second output channel; said receiver having a first and a second reception channel at which signals are produced corresponding to the output channels of said transmitter; a pair of transducers for converting electrical signals; circuit means for applying the combined signal from both reception channels to one of said transducers; means for applying the signal from the second reception channel to the other transducer; and means operative between said circuit means for relatively inverting the phase of the signals combined.

14. The combination as set forth in claim 13 in which said first named circuit means is designed to produce linear phase shift substantially throughout the frequency range of said low frequency components, and in which said means for applying the qualitative combined signal to said first output channel is designed to introduce linear phase shift substantially throughout the frequency range of said combined signals, and equivalent to the phase shift produced by said first named circuit means.

15. The combination as set forth in claim 14 in which said inverting means is in advance of the second output of said transmitter.

16. A compatible stereophonic transmission system comprising a transmitter and a receiver, the transmitter having a first and a second output channel and two input channels, the two input channels being cooperable with two transducers for providing first and second signals corresponding to right and left or the like; means for applying the qualitative combined signal from said input channels to said first output channel, and including means introducing a phase shift that is a linear function of frequency throughout the frequency range of said combined signals; means for applying only the low frequency components of at least one of the input channel signals to said second output channel; said receiver having first and second reception channels at which signals are produced corresponding to the output channels of said transmitter; a pair of transducers for converting electrical signals; and means for arithmetically combining the signals from said reception channels so that the low frequency components of the signals at the respective transmitter input channels are substantially separately and exclusively applied to the transducers.

References Cited in the file of this patent

UNITED STATES PATENTS

| | | |
|---|---|---|
| 2,554,693 | Bedford | May 29, 1951 |
| 2,776,429 | Loerud | Jan. 1, 1957 |
| 2,851,532 | Crosby | Sept. 9, 1958 |
| 2,874,221 | Dauguet | Feb. 17, 1959 |